(12) United States Patent
Muegge et al.

(10) Patent No.: US 12,313,237 B2
(45) Date of Patent: May 27, 2025

(54) LIGHTING DEVICE FOR VEHICLES

(71) Applicant: HELLA GmbH & Co. KGaA, Lippstadt (DE)

(72) Inventors: Martin Muegge, Geseke (DE); Dirk Wilmes, Geseke (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/625,872

(22) Filed: Apr. 3, 2024

(65) Prior Publication Data
US 2024/0328592 A1    Oct. 3, 2024

(30) Foreign Application Priority Data
Apr. 3, 2023 (DE) ...................... 10 2023 108 470.4

(51) Int. Cl.
*F21S 43/243* (2018.01)
*F21S 43/239* (2018.01)
*F21S 43/249* (2018.01)
*F21S 43/31* (2018.01)
*F21V 8/00* (2006.01)

(52) U.S. Cl.
CPC ........... *F21S 43/243* (2018.01); *F21S 43/239* (2018.01); *F21S 43/249* (2018.01); *F21S 43/315* (2018.01); *G02B 6/0025* (2013.01); *G02B 6/0051* (2013.01)

(58) Field of Classification Search
CPC ...... F21S 43/243; F21S 43/249; F21S 43/239; F21S 43/315; G02B 6/0025; G02B 6/0051
See application file for complete search history.

(56) References Cited

U.S. PATENT DOCUMENTS

| | | |
|---|---|---|
| 8,770,812 B2 | 7/2014 | Kino et al. |
| 2015/0233539 A1 | 8/2015 | Sagna et al. |
| 2019/0137046 A1 | 5/2019 | Hwang et al. |
| 2019/0275925 A1 | 9/2019 | Chen et al. |
| 2020/0182428 A1 * | 6/2020 | Antonipieri .............. B60Q 3/64 |
| 2022/0299187 A1 | 9/2022 | Muegge et al. |
| 2023/0347818 A1 * | 11/2023 | Dekievit .................. B60Q 3/66 |

(Continued)

FOREIGN PATENT DOCUMENTS

| | | |
|---|---|---|
| DE | 102014200369 A1 | 7/2015 |
| DE | 102019133693 A1 | 6/2021 |

(Continued)

*Primary Examiner* — Christopher E Dunay
(74) *Attorney, Agent, or Firm* — Muncy, Geissler, Olds & Lowe, P.C.

(57) ABSTRACT

A lighting device for a vehicle, including a light source that is arranged on a circuit board, and a flat light guide, wherein a narrow side of the flat light guide is provided for coupling in light that is emitted by the light source. Oppositely arranged flat sides of the flat light guide are provided for relaying the coupled-in light via total reflection at the flat sides, and including a micro-optics structure that extends on a flat side of the flat light guide so that the flat side of the flat light guide, as a light outcoupling surface, is used to couple out the coupled-in light transversely with respect to a plane of extension of the flat light guide. The circuit board is arranged on a side opposite from the light outcoupling surface of the flat light guide, and the light source is arranged in an overhang portion of the circuit board that protrudes beyond a peripheral edge of the flat light guide.

18 Claims, 5 Drawing Sheets

(56) References Cited

U.S. PATENT DOCUMENTS

2023/0408054 A1* 12/2023 Muegge .................. F21S 43/14
2024/0125444 A1*  4/2024 Drueppel ................ F21S 43/50
2024/0263757 A1*  8/2024 Kreipe .................. F21S 43/249

FOREIGN PATENT DOCUMENTS

EP       2711610 A1   3/2014
KR     200465474 Y1   2/2013

* cited by examiner

LIGHTING DEVICE FOR VEHICLES

This nonprofessional application claims priority under 35 U.S.C. § 119 (a) to German Patent Application No. 10 2023 108 470.4, which was filed in Germany on Apr. 3, 2023, and which is herein incorporated by reference.

BACKGROUND OF THE INVENTION

Field of the Invention

The invention relates to a lighting device for vehicles, including a light source that is arranged on a circuit board, and a flat light guide, wherein a narrow side of the flat light guide is provided for coupling in light that is emitted by the light source, and oppositely arranged flat sides of the flat light guide are provided for relaying the coupled-in light via total reflection at the flat sides, and including a micro-optics structure that extends on a flat side, so that the flat side of the flat light guide, as a light outcoupling surface, is used to couple out the coupled-in light transversely with respect to a plane of extension of the flat light guide.

Description of the Background Art

A lighting device for vehicles, including a light source that is arranged on a circuit board, and a flat light guide, is known from DE 10 2019 133 693 A1, which corresponds to US 2022/0299187, which is incorporated herein by reference. The light source is arranged on a narrow side of the flat light guide, so that the light emitted by the light source is coupled in on the narrow side of the flat light guide. The coupled-in light is totally reflected on oppositely arranged large-surface flat sides that adjoin edges of the narrow side, and relayed. Mounted on a first flat side of the flat light guide is a micro-optics structure that results in scattering when the coupled-in light strikes the micro-optics structure, as a result of which the light beams are coupled out on this flat side. Since the circuit board bears further electronic components in addition to the number of light sources, an extension of the circuit board in the main radiation direction of the lighting device may be greater than a thickness of the flat light guide. The lighting device thus may acquires a relatively large installation depth.

A lighting device for vehicles, including a light source and a flat light guide, is known from EP 2 711 610 A1, in which the light source is arranged on a narrow side of an extension portion of the flat light guide. By means of the extension portion, the light emitted by the light source is deflected by 90° to a main section of the flat light guide. Since a circuit board that bears the light source is arranged on the narrow side of the flat light guide, the lighting device has a relatively large dimension transverse to a normal of the flat light guide.

In the known lighting devices, it is disadvantageous that, due to the circuit board, they have a relatively large transverse extension perpendicular to the plane of extension of the flat light guide.

SUMMARY OF THE INVENTION

It is therefore an object of the present invention to refine a lighting device for vehicles, including an integrated flat light guide, in such a way that a transverse extension or installation depth of the lighting device is reduced, so that a compact flat lighting module is formed.

To achieve this object, a circuit board can be arranged on a side opposite from the light outcoupling surface of the flat light guide, and the light source is arranged in an overhang portion of the circuit board that protrudes beyond a peripheral edge of the flat light guide.

An advantage of the invention is that a space-saving, compact lighting device is provided which is easily mountable in an opening in the body of the vehicle. The basic concept of the invention is to provide a circuit board, bearing the light source, in parallel with a plane of extension of the flat light guide or on a side opposite from the light-outcoupling front flat side of the flat light guide. It is thus advantageously possible to provide a layered structure of flat components, including the circuit board, wherein neighboring components flatly adjoin one another in each case. The circuit board is arranged in such a way that the light source is arranged in an overhang portion of the circuit board that protrudes beyond a peripheral edge of the flat light guide in the direction of extension of same, so that incoupling of light into the flat light guide can take place via a narrow side. The circuit board is thus arranged in parallel to the flat light guide in the main radiation direction of the lighting device, behind same. This results in flatness of the unit thus formed, which is determined by a thickness of the flatly adjoining components (component layers). The light source is arranged in a side region, and preferably extends in a spatial area that protrudes beyond a rear flat side of the flat light guide in the main radiation direction of the lighting device.

The micro-optics structure can be arranged on a substrate, wherein a plurality of micro-optics elements that are preferably adaptively distributed extend over the surface area of the substrate. The substrate may be a film or a fixed light pane in which or on which the micro-optics elements are arranged on the flat side. A simple layered structure of flat components having a simple design may be achieved in this way.

The circuit board can have a flat design, and its dimensions are larger than those of the flat light guide. This ensures that the circuit board and the flat light guide can be correctly aligned during the manufacturing process. In particular, the narrow side of the circuit board arranged opposite from the overhang portion may be in flush alignment with the corresponding narrow side of the circuit board, thus ensuring that the light source is positioned in a side space of the housing. The manufacture of the lighting device may advantageously be simplified in this way.

The circuit board can be provided with a bright reflective coating on a flat side facing the flat light guide. It is thus advantageously possible to dispense with an additional reflective film for reflecting the light exiting at the rear flat side of the light guide. In this example, the circuit board may rest directly against the rear flat side of the flat light guide.

A reflective film having a diffuse white color, for example, may be arranged between the circuit board and the flat light guide. The reflection of light exiting from the rear side of the flat light guide in the main radiation direction of the lighting device is thus ensured in a simple way.

The micro-optics structure can be covered by a light pane, so that the micro-optics structure is arranged between the flat light guide and the light pane. The light pane may optionally include further scattering elements that have a diffusing effect.

A flat lighting module can be provided that has a layered structure of the flatly adjoining circuit board, the flat light guide, the substrate, and optionally the light pane, which are arranged in a housing space bordered by a rear housing shell and a front housing frame. The layered components are arranged in the main space, while the light source and the overhang portion of the circuit board are arranged in a side space. A compact lighting device having a relatively small thickness or installation depth is thus advantageously provided, with the installation depth being determined essentially by the thicknesses of the layered components, the housing shell, and the housing frame.

The light source can extend in the side region of the housing interior while crossing over a plane of extension of a rear flat side of the flat light guide in the main radiation direction of the lighting device, so that the light source is arranged to the side of the flat light guide. In this way, the proportion of the light that is coupled into the narrow-side light incoupling surface of the flat light guide may advantageously be kept relatively high.

The light source can be designed as a light source that emits in the lateral direction, wherein a main radiation direction of the light source extends transversely with respect to an axis of the light source or in parallel to the circuit board, so that by positioning the light source directly in front of the light-incoupling narrow side of the flat light guide, light incoupling is possible without further auxiliary components.

A deflecting reflector or an extension portion of the flat light guide having an incoupling optics unit may be associated with the light source, so that the light source may be designed as a conventional light source having a main radiation direction transverse to the circuit board.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

A lighting device according to the invention for vehicles may be designed as a signal light that is used, preferably in the rear area of the vehicle, to generate a taillight/brake light/blinker light function or an additional backup light function.

Figure 1:
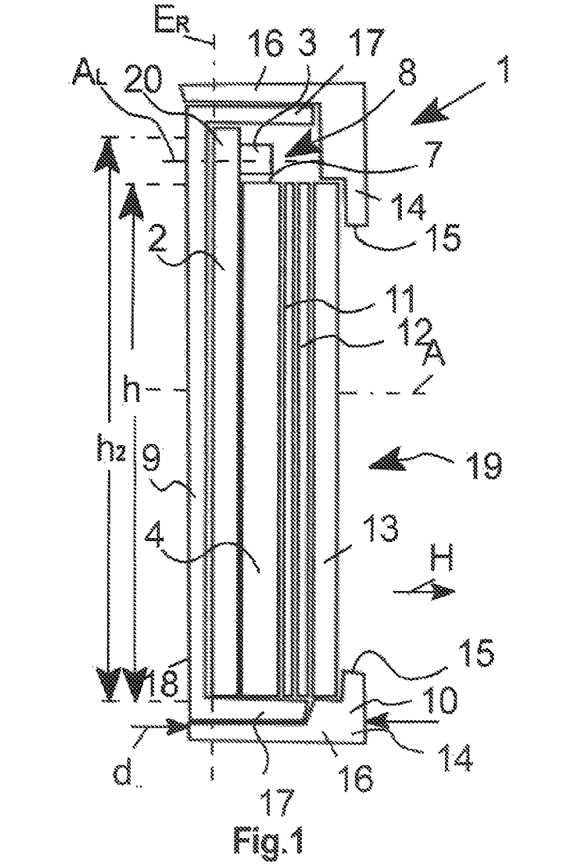
FIG. 1 shows a cross section of a flat lighting module according to an example.
Figure 2:
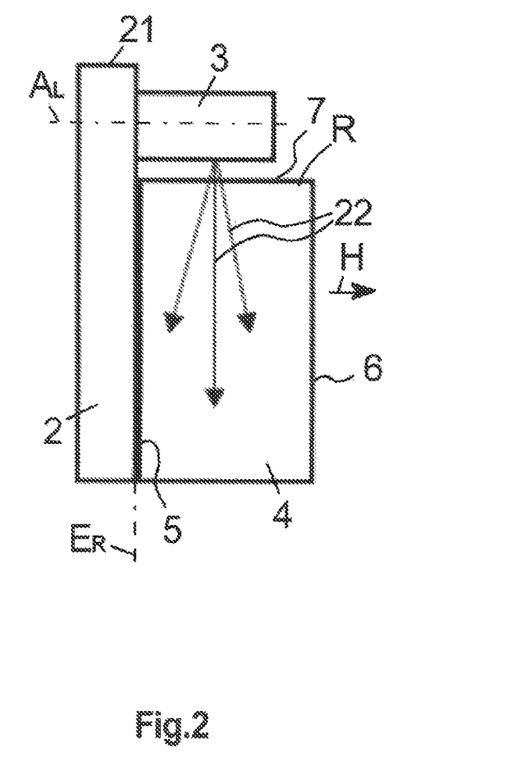
FIG. 2 shows an enlarged schematic illustration of a light incoupling region of the flat lighting module according to FIG. 1.
Figure 3:
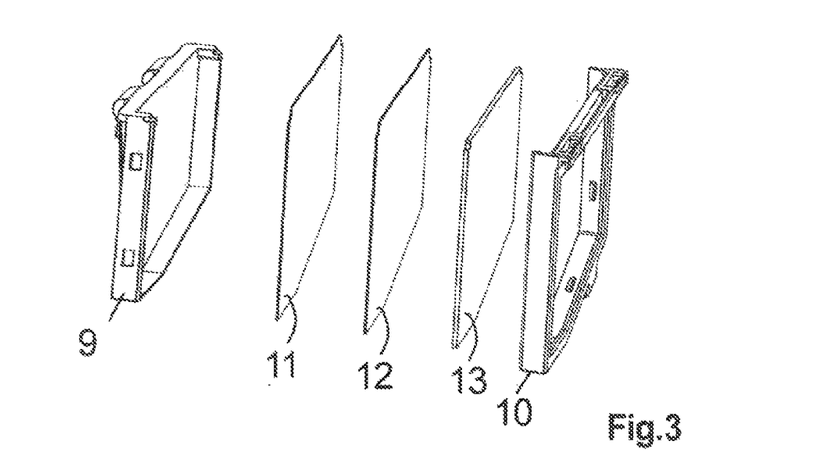
FIG. 3 shows an exploded illustration of the flat lighting module, with a flat lighting module and a circuit board omitted.

According to an example of the invention according to FIGS. 1 through 3, a flat lighting module 1 is provided which includes a flat circuit board 2, and in an edge region thereof, a linear row of light sources 3. The light sources 3 are preferably designed as LED light sources that emit in different colors, for example red, yellow, or white, so that different signal light functions, for example red taillights and brake lights, yellow blinker lights, and white backup lights may be produced. An activation unit is preferably provided on the circuit board 2, by means of which the light sources 3 are activated, depending on the desired signal light function. The light sources 3 may thus be individually activated in a selective manner. Thus, via an alternating arrangement of the light sources 3 in a row with relatively close spacing, the entire light outcoupling surface of the flat lighting module 1 may be utilized for a given signal function.

A flat light guide 4 having a rear flat side 5 and a front flat side 6 extending in parallel thereto, which run parallel to the circuit board 2, is provided in the main radiation direction H of the lighting device, in front of the circuit board 2. The flat sides 5, 6 are joined together by narrow sides, a first narrow side 7 being used as a light incoupling surface of the flat light guide 4. This narrow side 7 is arranged on a side facing a side region 8 of a housing interior, the housing interior being delimited by a rear housing shell 9 and a front housing frame 10.

A first film 11 and a second film 12 are arranged in the main radiation direction H of the lighting device, in front of the flat light guide 4, a micro-optics structure being integrated into the first film 11. A scattering optics structure is integrated into the second film 12.

A light pane 13, which may preferably have scattering optics elements on a front flat side in the main radiation direction H, is provided in the main radiation direction H, in front of the films 11, 12. The light pane 13 abuts an indentation in a first leg 14 of the housing frame 10. Free peripheral edges 15 of the first leg 14 delimit a light outcoupling opening of the flat conductor lighting module 1. A second leg 16 of the housing frame 10 covers a wall 17 of the housing shell 9 on the outer side, the wall 17 protruding perpendicularly from a base 18 of the housing shell 9.

The circuit board 2, the flat light guide 4, the first film 11, the second film 12, and the light pane 13 each form flat layers. This layered structure is bordered by the housing shell 9 and the housing frame 10, and is joined together in a form-fit and force-fit manner or an integrally bonded manner.

A main region 19 of the housing interior is covered by this layered structure. The flat light guide 4, the first film 11, the second film 12, and the light pane 13 lie in flush abutment with one another, and have the same width and height h. Only the circuit board 12 has a height $h_L$, which is greater than the height h of the flat light guide 4 or of the other layered components 11, 12, 13. The circuit board 2 has a main section 33 and an overhang portion 20 on one side in the direction of extension of the main section, whose height results from the difference between the height hi of the circuit board 2 and the height h of the flat light guide 4. The overhang portion 20 of the circuit board 2 thus extends in the side region 8 of the housing interior, in which the plurality of light sources 3 are additionally present. The side region 8 extends over the entire width of the housing interior. A plurality of light sources 3 may be arranged in this width direction with preferably equidistant spacing from one another. Thus, a first narrow side 21 of the circuit board 2, arranged in the side region 8 of the housing interior, is not in flush alignment with the first narrow side 7 of the flat light guide 4. The other narrow sides of the circuit board 2 are in flush alignment with the corresponding narrow sides of the flat light guide 4, as is apparent from the exploded illustration according to FIG. 3. The main section 33 of the circuit board 2 has the same dimensions as the flat light guide 4, the films 11, 12, and the light pane 13.

The shapes of the circuit board 2 and of the flat light guide 4 are specified by the shapes of the housing shell 9 and of the housing frame 10. The circuit board and the flat light guide can have a square, flat shape. Alternatively, they may have a rectangular, square, circular, or polygonal design. In the present example, the flat lighting module 1 can have a square design transverse to an optical axis A thereof. A thickness d of the flat lighting module 1 is determined or specified by the sum of the thicknesses of the circuit board 2, the flat light guide 4, and the light pane 13. A rear flat side of the circuit board 2 rests directly against the base 18 of the housing shell 9. A front flat side of the light pane 13 rests directly against the indentation in the front housing frame 10 on the edge side. The circuit board 2, the flat light guide 4, the films 11, 12, and the light pane 13 rest directly against one another in a flat, even manner.

According to the example according to FIGS. 1 and 2, the at least one light source 3 is designed as a laterally emitting light source (side emitter LED) in which a main radiation direction of the light source 3 extends laterally with respect to an axis $A_L$ of the light source 3, i.e., in parallel to a rear plane of extension ER of the flat light guide 4 or in parallel to a plane of extension of the circuit board 2. The light source 3 protrudes from the front flat side 6 of the circuit board 2, beyond the plane of extension ER of the rear flat side 5 of the flat light guide 4, so that laterally emitted light 22 may be coupled into the first narrow side 7 of the flat light guide 4, which serves as the light incoupling surface. Within the flat light guide 4, the light is relayed in the direction of extension of the flat light guide 4 by total reflection at the rear flat side 5 and the front flat side 6. As a result of the first film 11 that includes the micro-optics elements, coupled-in light 22 that strikes the first film in the main radiation direction H is deflected, and is thus coupled out from the flat light guide 4.

At least one front flat side of the circuit board 2, arranged on a side of the circuit board 2 facing the flat light guide 4, may have a reflective coating formed by a solder resist, or by a solder resist and an additional lacquering or coating, so that the light 22, which otherwise is coupled out at the rear flat side 5 of the flat light guide 4, is reflected back in the direction of the flat light guide 4, with the result that it is then emitted in the main radiation direction H via the front flat side 6. The reflective coating should preferably be bright so that the reflection component is significantly higher compared to the absorption component, for example white. The front flat side 6 of the flat light guide 4 is used as a light outcoupling surface of the flat light guide 4.

Alternatively, the rear flat side 5 of the flat light guide 4, 4' may have a reflective coating, in particular lacquering.

Figure 11:
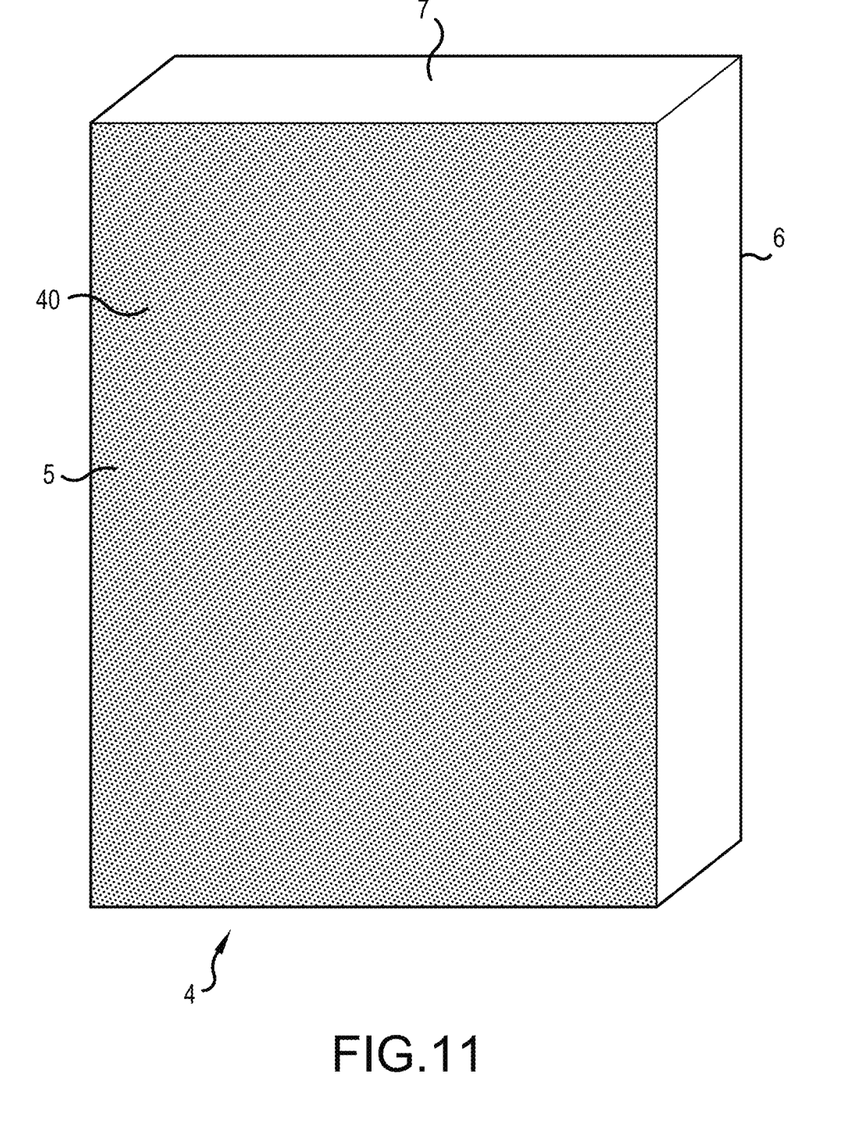
FIG. 11 shows exemplary micro-optic elements on the rear flat side of the flat light guide.

The rear flat side 5 of the flat light guide 4 or the front flat side 6 of the flat light guide 4 may have a micro-optics structure. The flat sides 5, 6 preferably form a substrate for micro-optics elements. In the exemplary FIG. 11, micro-optics elements 40 are shown as extending on the rear flat side 5 of the flat light guide 4.

It is apparent from FIG. 1 that the light source 3 is arranged so that it protrudes beyond a peripheral edge R of the flat light guide 4 that is formed by the first narrow side 7. The light source 3 and the overhang portion 20 of the circuit board 2 are arranged in the side region 8 of the housing.

The micro-optics structure may be arranged on a fixed light pane as a substrate, not on a film 11 as a substrate.

A reflective film may be arranged between the circuit board 2 and the flat light guide 4, by means of which the light 22 that is coupled out on the rear flat side 5 is reflected back in the main radiation direction H. In this example, the circuit board 2 does not need to have a reflective coating.

Figure 4:
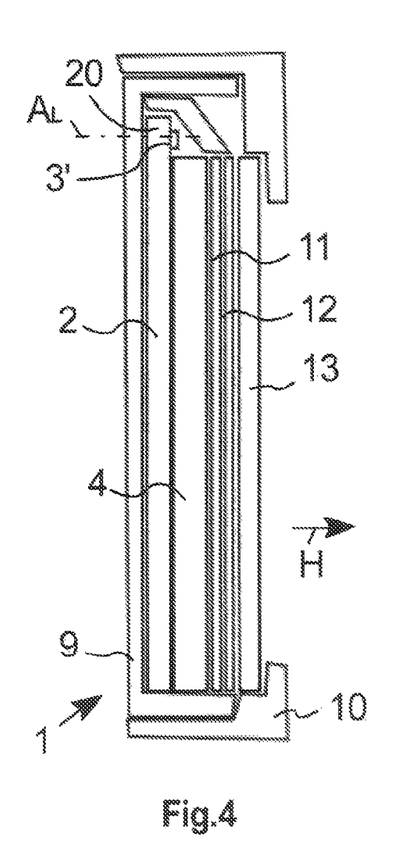
FIG. 4 shows a cross section of a flat lighting module according to an example.
Figure 5:
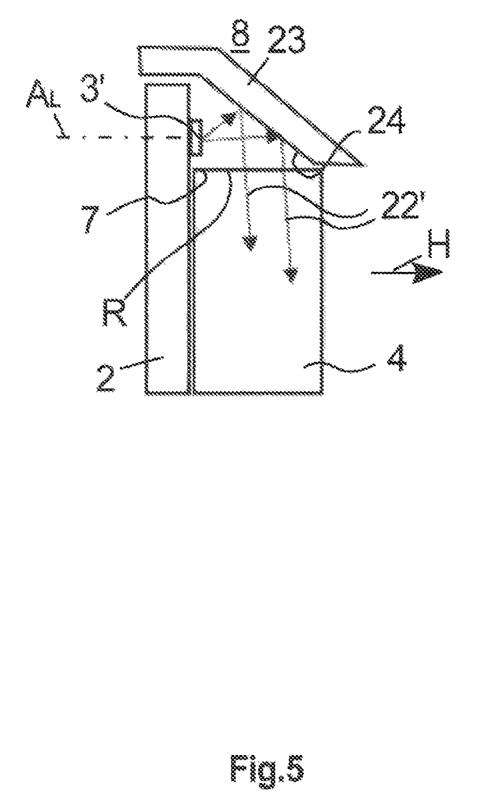
FIG. 5 shows an enlarged illustration of a light incoupling region of the flat lighting module according to FIG. 4.

According to an example of the invention according to FIGS. 4 and 5, in contrast to the first example a light source 3' is provided as a light source, whose main radiation direction H extends in the direction of the main axis $A_L$ thereof. Thus, this is a conventional LED light source, known as a top LED light source. The main radiation direction H of the light source 3' thus extends in parallel to the main radiation direction H of the flat lighting module 1.

In order for light 22' that is emitted by the light source 3' to be able to enter into the light incoupling surface 7 of the flat light guide 4, a deflecting reflector 23 is provided in the side region 8 of the housing interior. A mirrored reflective surface 24 of the deflecting reflector 23 is arranged on a side facing the light source 3', and brings about a reflection of the light 22', emitted by the light source 3, in the direction of the light incoupling surface 7. The reflective surface 24 may have a flat, cylindrical, or parabolic shape. This is a function of the shape or wall thickness of the flat light guide 4.

Figures 7, 8:
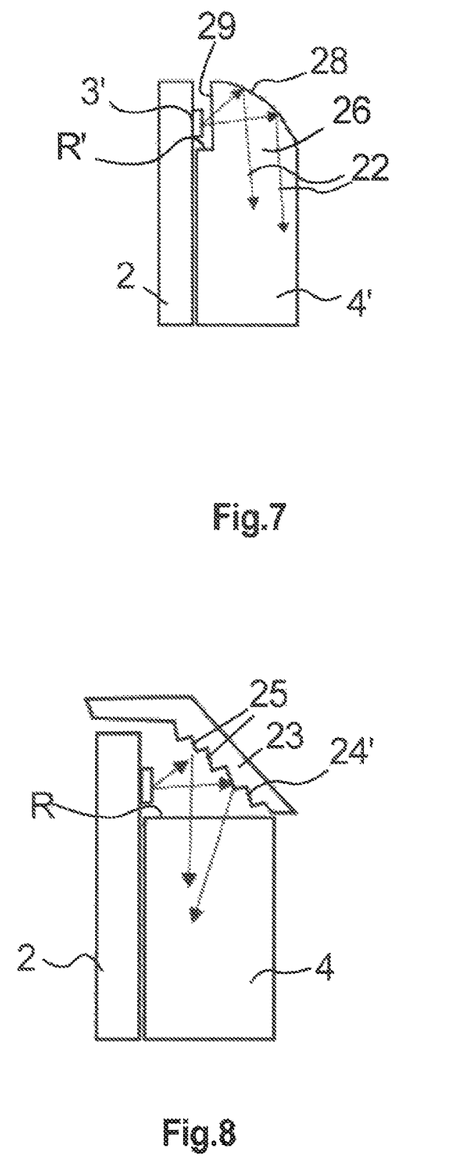
FIG. 7 shows an enlarged illustration of a light incoupling region of the flat lighting module according to FIG. 6.
FIG. 8 shows an illustration of the light incoupling region according to an example of the invention.

According to an example of the invention according to FIG. 8, instead of a smooth design of the reflective surface 24, in contrast to the example according to FIG. 5 a reflective surface 24' having prisms 25 may be provided. The reflective surface 24' may optionally also be provided with micro-optics elements, which have dimensions in the micron range.

Figure 6:
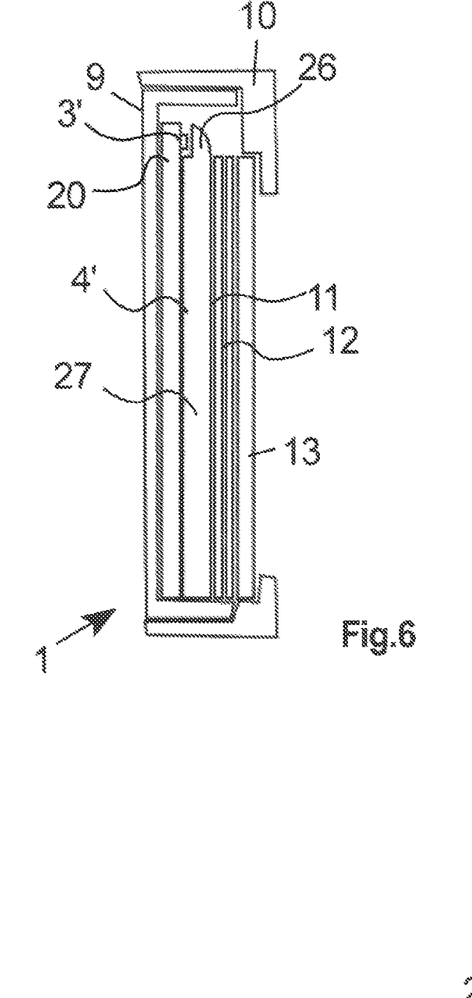
FIG. 6 shows a cross section of a flat lighting module according to an example.

According to an example of the invention according to FIGS. 6 and 7, a flat lighting module 1 is provided which differs from the flat lighting module 1 according to FIGS. 4 and 5 in that, instead of a deflecting reflector 23, a flat light guide 4' has an extension portion 26 that reaches to the side region 8 of the housing interior. The extension portion 26 is connected in one piece to a main section 27 of the flat light guide 4', the dimensions of the main section 27 of the flat light guide 4' matching the dimensions of the entire flat light guide 4 in the examples. On a side facing away from the light source 3', the extension portion 26 has a mirrored reflective surface 28, by means of which coupled-in light 22" is deflected in the direction of extension of the flat light guide 4'. On a side facing the light source 3', the extension portion 26 has a light incoupling surface 29 that has a recessed design, with respect to the rear flat side 5 of the flat light guide 4', for accommodating the light source 3'. The light incoupling surface 29 may optionally have an incoupling optics unit. The light incoupling surface 29, which at the same time forms a narrow side of the flat light guide 4', is arranged in parallel to the direction of extension of the flat light guide 4', and not perpendicular to the direction of extension of same. A peripheral edge R' of the flat light guide 4' is arranged at a boundary between the main section 27 and the extension portion 26 of the flat light guide 4'.

It is apparent that the light source 3' has a flatter design than the light source 3. A dimension of the light source 3' extending transversely with respect to the plane of extension of the flat light guide 4' is significantly smaller than that of the light source 3.

Figure 9:
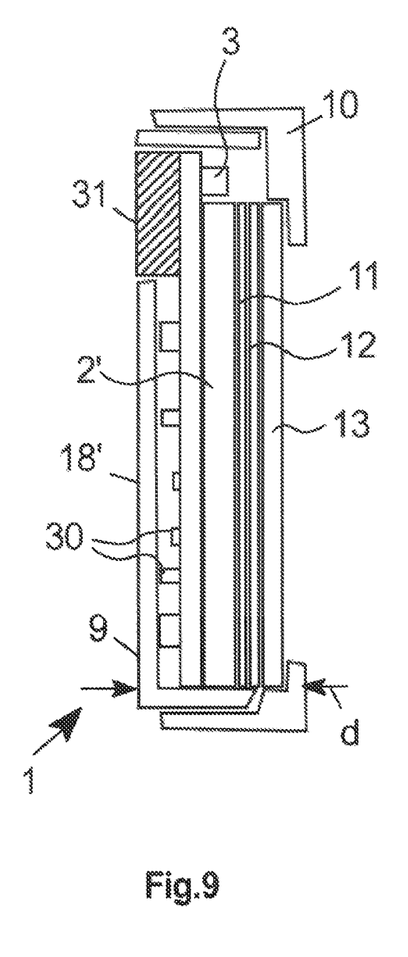
FIG. 9 shows a cross section of a flat lighting module with an integrated heat sink according to the example of the invention.

According to FIG. 9, in contrast to FIGS. 1 and 2 the flat lighting module 1 can have a circuit board 2' that is fitted with electronic components on both sides. On the one hand, on a front flat side the circuit board 2' has the light source 3 on the edge side. On the other hand, on a rear flat side the circuit board 2' has a plurality of further electronic components 30. This increases the thickness d of the flat lighting module 1. A base 18' of the housing shell 9 has a recess in the edge region, in which a heat sink 31 is provided. This heat sink extends in an elongated manner over the entire width of the flat lighting module 1, and is arranged directly behind the light sources 3 arranged in a row. Heat dissipation of the light sources 3 or of the further electronic components 30 is advantageously made possible in this way. In addition, the entire electronics system or electronic control of the flat lighting module 1 may thus be easily introduced.

Figure 10:
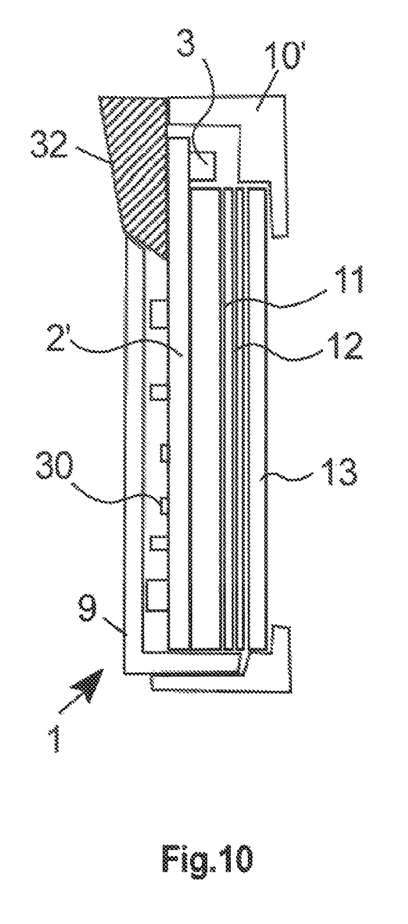
FIG. 10 shows a cross section of the flat lighting module with an integrated alternative heat sink.

According to FIG. 10, a heat sink 32 may be provided which protrudes beyond a peripheral edge of the circuit board 2' and replaces walls of the housing shell 9. In this case, the heat sink 32 is connected to a housing frame 10' on a peripheral side.

Further, the flat lighting module 1 may also be designed without the presence of the light pane 13.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A lighting device for a vehicle, the lighting device comprising:
    a light source arranged on a circuit board;
    a flat light guide having a narrow side that is provided for coupling in light that is emitted by the light source, and having flat sides that are parallel to one another, the flat sides including a rear flat side and a front flat side, the rear and front flat sides relaying the coupled-in light via total reflection at the rear and front flat sides; and
    a micro-optics structure that extends on the rear flat side or the front flat side of the flat light guide, so that the front flat side of the flat light guide; is a light outcoupling surface that couples out the coupled-in light transversely with respect to a plane of extension of the flat light guide,
    wherein the circuit board is arranged on a side of the flat light guide that is opposite from the light outcoupling surface of the flat light guide, such that the rear flat side of the flat light guide faces the circuit board and the light outcoupling surface faces away from the circuit board, and
    wherein the light source is arranged in an overhang portion of the circuit board that protrudes beyond a peripheral edge of the flat light guide.

2. The lighting device according to claim 1, wherein the micro-optics structure includes a plurality of micro-optics elements arranged on at least one substrate, the at least one substrate being a film or a fixed light pane disposed on the front flat side of the flat light guide.

3. The lighting device according to claim 1, wherein the circuit board has a flat design, with a surface area that is larger than a surface area of the flat light guide, wherein all narrow sides of the circuit board, except for the narrow side of the overhang portion, are in flush alignment with the narrow sides of the flat light guide.

4. The lighting device according to claim 1, wherein the circuit board has a reflective coating on a flat side facing the rear flat side of the flat light guide.

5. The lighting device according to claim 4, wherein the reflective coating of the circuit board is formed by a solder resist, or by a solder resist and an additional lacquering or coating.

6. The lighting device according to claim 1, wherein a reflective film containing a reflective surface is arranged between the circuit board and the flat light guide.

7. The lighting device according to claim 1, wherein the micro-optics structure includes a plurality of micro-optics elements arranged on at least one substrate, and wherein a light pane is arranged in a main radiation direction of the lighting device, in front of the flat light guide and in front of the at least one substrate.

8. The lighting device according to claim 7, wherein the circuit board, the flat light guide, the at least one substrate, and the light pane are bordered by a housing shell arranged at the rear, and by a housing frame arranged at the front, to form a flat lighting module, wherein a main section of the circuit board, the flat light guide, the at least one substrate, and the light pane are arranged in a main region of a housing interior that is delimited by the housing shell and the housing frame, and wherein the overhang portion of the circuit board and the light source are arranged in a side region of the housing interior.

9. The lighting device according to claim 8, wherein the housing shell has a base and walls that protrude from side edges of the base.

10. The lighting device according to claim 8, wherein the housing frame has a first leg for covering a side edge of the light pane, and a second leg for covering the walls of the housing shell.

11. The lighting device according to claim 8, wherein a thickness of the flat lighting module is a sum of a thickness of the housing shell, a thickness of the circuit board, a thickness of the flat light guide, and a thickness of the light pane.

12. The lighting device according to claim 8, wherein the light source is designed such that a main radiation direction of the light source extends transversely with respect to a plane of extension of the circuit board, and a deflecting reflector or an extension portion of the flat light guide, including an incoupling optics unit facing the light source is arranged in the side region of the housing interior.

13. The lighting device according to claim 1, wherein the narrow sides of the flat lighting module extend in a rectangular, square, circular, or polygonal manner.

14. The lighting device according to claim 1, wherein the light source is arranged on a front flat side of the circuit board in the main radiation direction of the lighting device such that the light source protrudes beyond a plane of extension of the rear flat side of the flat light guide in the main radiation direction of the lighting device.

15. The lighting device according to claim 1, wherein the light source is designed such that a main radiation direction of the light source extends laterally with respect to an axis of the light source and in parallel to a plane of extension of the circuit board.

16. The lighting device according to claim 1, wherein the flat light guide has an extension portion that protrudes therefrom, the extension portion protruding from the flat light guide at a position adjacent to the peripheral edge, such that the extension portion protrudes beyond the peripheral edge and is aligned with the overhang portion of the circuit board.

17. The lighting device according to claim 16, wherein the narrow side that provides for coupling in light emitted by the light source is provided on the extension portion, the narrow side facing the overhang portion of the circuit board and being aligned with the overhang portion.

18. The lighting device according to claim 17, wherein the extension portion has a reflective surface that deflects light coupled in via the narrow side in a direction towards the flat light guide.

* * * * *